United States Patent [19]

Sekigawa

[11] Patent Number: 5,260,803
[45] Date of Patent: Nov. 9, 1993

[54] FACSIMILE DEVICE

[75] Inventor: Sumio Sekigawa, Daito, Japan

[73] Assignee: Funai Electric Company Limited, Osaka, Japan

[21] Appl. No.: 914,109

[22] Filed: Jul. 15, 1992

Related U.S. Application Data

[63] Continuation of Ser. No. 522,595, May 14, 1990, abandoned.

[30] Foreign Application Priority Data

Dec. 21, 1989 [JP] Japan .................. 1-334177

[51] Int. Cl.⁵ .............................. H04N 1/00
[52] U.S. Cl. ................... 358/434; 358/406; 358/405; 379/406
[58] Field of Search ........... 358/405, 406, 407, 409, 358/410, 411, 426, 434, 435, 401, 443, 436–439, 463; 379/406, 409, 410, 414, 416, 96

[56] References Cited

U.S. PATENT DOCUMENTS

| | | | |
|---|---|---|---|
| 4,153,916 | 5/1979 | Miwa et al. | 358/406 |
| 4,727,429 | 2/1988 | Ueno | 358/405 |
| 4,885,755 | 12/1989 | Yoshida | 379/96 |
| 4,999,716 | 3/1991 | Nakamura | 358/434 |

FOREIGN PATENT DOCUMENTS 0021364  1/1987  Japan ................. 379/406

*Primary Examiner*—Edward L. Coles, Sr.
*Assistant Examiner*—Jerome Grant, II
*Attorney, Agent, or Firm*—James D. Hall; Thomas J. Dodd

[57] ABSTRACT

A facsimile device which stores the data of the incoming level of a training signal in the incoming mode, and judges this to be the starting point for receiving the picture signal when the incoming level after transferring the CFR signal is larger than the threshold level which is lower than the abovementioned stored incoming level by a predetermined value. The picture signal can be received with stability even when a circuit echo occurs.

2 Claims, 2 Drawing Sheets

FACSIMILE DEVICE

This is a continuation of copending application Ser. No. 07/522,595 filed on May 14, 1990 now abandoned.

BACKGROUND OF THE INVENTION

The present invention relates to stabilizing an incoming picture signal in a facsimile device.

In conventional facsimile devices, a picture signal is transferred after the execution of a predetermined procedure of transfer control between a called subscriber and a calling subscriber. In the procedure of transfer control, there is a device in which a CFR (Confirmation to Receive) signal is transferred to the calling subscriber after receiving a training signal in the called subscriber, then, a picture signal is received in response to the CFR signal.

When a circuit echo occurs in a loop between transferring and receiving in an international telecommunication via satellite, it becomes difficult to detect a time period with no signal and a starting point for receiving a response signal. As a result, for example, it is sometimes difficult to receive data of a manuscript in a device of a group 3 (G3) even when it is possible to receive the training signal in the procedure of transfer control.

SUMMARY OF THE INVENTION

An object of the present invention is to provide a facsimile device in which the data of the manuscript can be received with stability even when the circuit echo occurs as abovementioned.

In order to achieve this object, according to the present invention, the facsimile device having a means for executing a procedure of transfer control for transferring a CFR signal (Confirmation to Receive) to a calling subscriber after receiving a training signal at a called subscriber and for receiving a picture signal in response to the CFR signal comprises, a means for storing data at the incoming level of a training signal in an incoming mode, and a means for detecting whether or not an incoming level after transferring the CFR signal is larger than a threshold level which is lower than the abovementioned stored incoming level by a predetermined amount and for judging to be a starting point for receiving a response signal when the incoming level is higher than the threshold level.

Generally, the height of the level of the incoming signal such as the training signal and the like in the procedure of transfer control is nearly equal to that of the picture signal. On the other hand, an echo signal is somewhat smaller when compared with the above. Therefore, in the structure of the present invention, by judging to be the starting point for receiving the picture signal at the time of receipt of the signal which is larger than the threshold level which is lower than the level of the incoming signal such as the training signal and the like by a predetermined value, the picture signal can be received with stability without being influenced with noise by the circuit echo.

DETAILED DESCRIPTION OF THE PREFERRED EMBODIMENTS OF THE INVENTION

Figure 1:
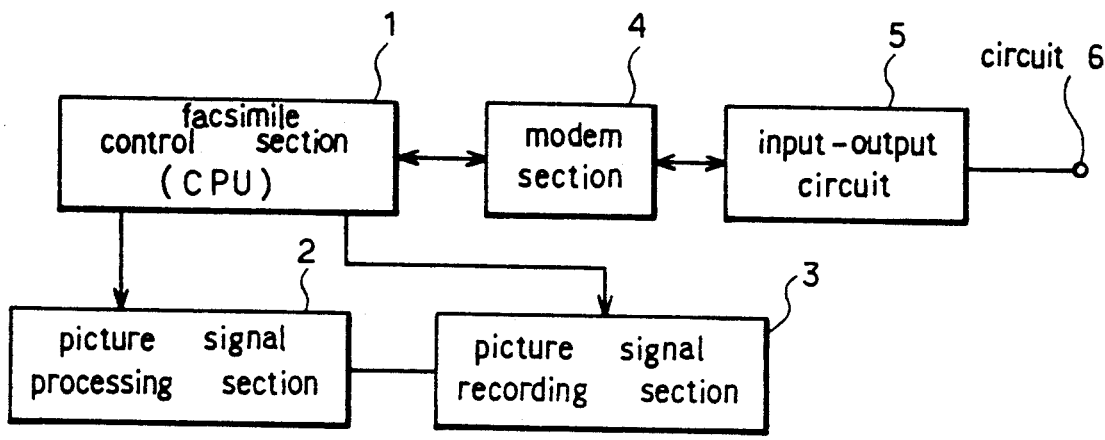
FIG. 1 is a block diagram of a facsimile device of an embodiment of the present invention.

FIG. 1 is a block diagram showing the structure of one embodiment of a facsimile device according to the present invention. The facsimile device comprises a facsimile control section 1 (Central Processing Unit) for executing transfer control including predetermined procedure, a picture signal processing section 2 for reading out a manuscript to transfer and for processing the signal thereof, and a picture signal recording section 3 for recording picture data obtained from a received signal. Further, the device is connected to a circuit 6 through a modem section 4 and an input-output circuit 5. The opposite end of circuit 6 is connected to a receiving device (a calling or a called subscriber).

Figure 2:
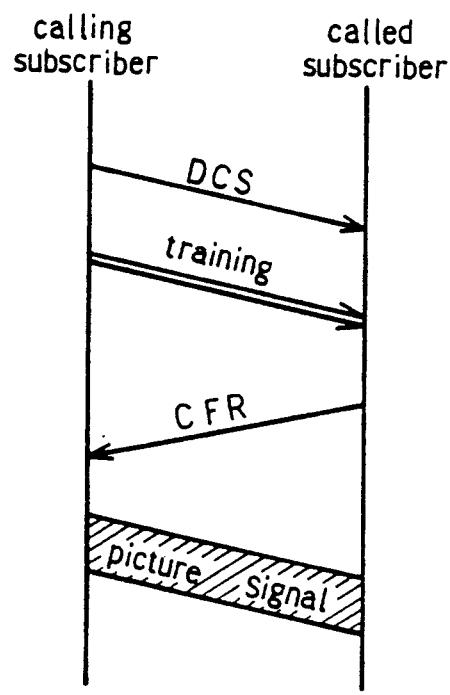
FIG. 2 is a schematic view showing a procedure of transfer control of the device.

FIG. 2 shows a schematic view of the procedure for transferring control of the facsimile device between the calling subscriber and the called subscriber. In FIG. 2, the called subscriber receives a DCS (Digital Command Signal) and a training signal outputted from the calling subscriber. When functions such as linear density and encoding system or an operating mode are fit for the called subscriber, the called subscriber outputs the CFR (Confirmation to Receive) signal to the calling subscriber. When the calling subscriber receives the CFR signal, it outputs a picture signal in response to the CFR signal.

Figure 3:
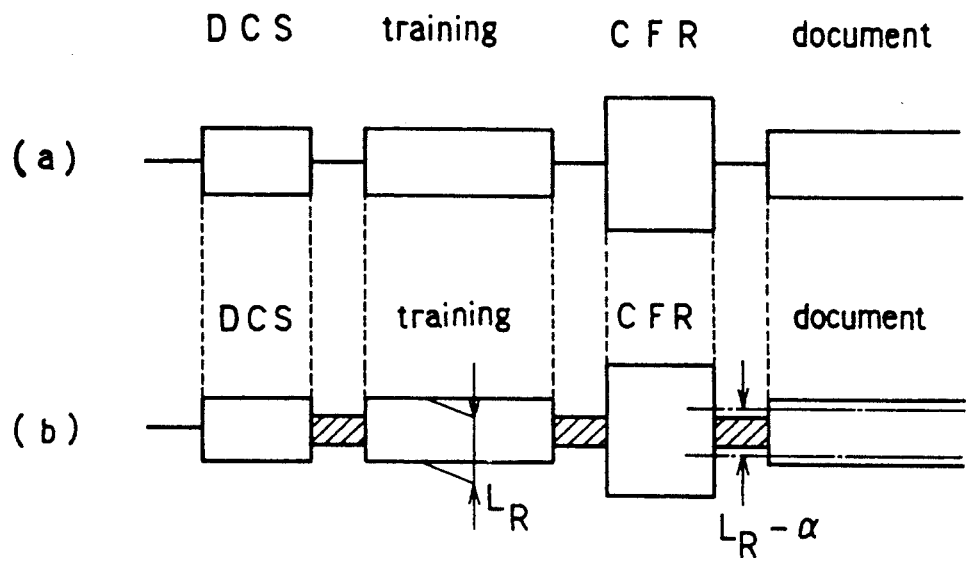
FIGS. 3(a) (b) are time charts of an incoming signal at ordinary time and at time when the circuit echo occurs respectively.
Figure 4:
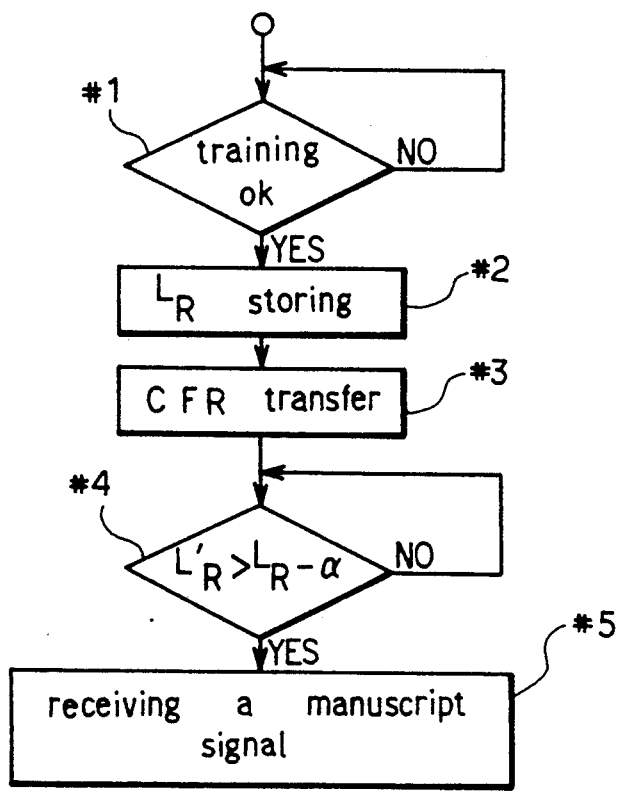
FIG. 4 is a flow chart of the procedure of transferring control.

FIG. 3(a) (b) show time charts of an incoming signal at ordinary time and at time when the circuit echo occurs respectively. FIG. 4 shows a flow chart of an operating procedure according to the present operation. An oblique line in FIG. 3(b) shows a noise signal caused by the circuit echo. When the circuit echo occurs, after transferring the CFR signal, it becomes difficult to detect the starting point for receiving a picture (document) signal which is a response signal thereof. Therefore, in this embodiment, data of an incoming level $L_R$ during the receipt of a training signal which is capable of being identified, is stored in a memory in the facsimile control section 1 in the called subscriber. After transferring the CFR signal, the incoming level ($L'_R$) that is a value lower than the level $L_R$ stored in the memory by predetermined value $\alpha$, is designated as the threshold level ($L_R \alpha$). When a signal larger than the threshold level is received, it is judged to be the starting point for receiving the picture (document) signal.

The predetermined value $\alpha$ may be determined properly in consideration of the change of the signal. For example, the lowest incoming signal level at ordinary time is about $-47$ to $-43$ dBm, and the incoming signal level is actually $-30$ dBm on average. Since it is appreciated that the echo signal level is lower than the above incoming signal level by 10 dB or more, the incoming level $L'_R$ after transferring CFR signal becomes $-36$ dBm when the predetermined value $\alpha$ is $-6$ dB.

Now, operations according to the present invention will be described with reference to a flow chart shown in FIG. 4. As a result of the receipt a training signal, when there is no problem (YES at #1), the incoming level $L_R$ during the training term is stored in the memory (#2), then the CFR signal is transferred (#3).

Whether or not the incoming level $L'_R$ afterward is larger than $L_R$-$\alpha$ is detected (#4), and when it is judged to be YES at #4, receiving the manuscript signal is started (#5). By executing the abovementioned procedure of transfer control, even when the circuit echo occurs, the normal incoming signal can be distinguished from the echo signal so that the normal incoming signal can be received stably.

As being apparent from the abovementioned description, according to the present invention, the level of the incoming signal such as the training signal which is surely distinguishable from a noise signal is picked up as the reference level. A subsequent incoming signals is compared with the threshold value, which is lower than the above reference training signal level by a predetermined value. When the incoming signal is larger than the threshold level, it is judged to be a normal signal, and therefore, the normal incoming signal can be received with stability even when a circuit echo occurs.

The invention may be embodied in other specific forms without departing from the spirit or essential characteristics thereof. The present embodiment is therefore to be considered in all respects as illustrative and not restrictive.

What is claimed is:

1. A facsimile device having a means for executing a procedure of transfer control for transferring a CFR signal (confirmation to Receive) to a calling subscriber after receiving a training signal at a called subscriber, and for receiving a picture signal in response to the CFR signal comprising;
    a means for storing a data of incoming level of a training signal in an incoming mode, and
    a means for detecting whether or not an incoming level after transferring the CFR signal is larger than a threshold level which is lower than the abovementioned stored incoming level by predetermined value, and for judging to be a starting point for receiving a response signal when the incoming level is higher than said threshold level.

2. A facsimile device capable of receiving a manuscript signal with stability even when a circuit echo occurs, comprising:
    means for receiving a training signal;
    means for storing a received level of the training signal;
    means for outputting a CFR (Confirmation to Receive) signal after receiving the training signal;
    means for receiving a manuscript signal after outputting the CFR signal; and
    means for detecting whether or not a received level of the manuscript signal is larger than a threshold level which is lower than the stored received level by a predetermined value; wherein
    the receiving means of the facsimile device starts to receive the manuscript signal when the detecting means that detects that the received level of the manuscript signal is higher than the threshold level.

* * * * *